US012785337B2

(12) United States Patent
Ding et al.

(10) Patent No.: US 12,785,337 B2
(45) Date of Patent: Nov. 3, 2026

(54) SINGLE-POLE CONNECTOR, MULTIPLE PLUG-TYPE CONNECTOR AND CONNECTOR SYSTEM CONSISTING THEREOF

(71) Applicant: HARTING ELECTRIC STIFTUNG & CO. KG, Espelkamp (DE)

(72) Inventors: Chuan Sheng Ding, Zhuhai (CN); Shao Wei Wen, Zhuhai (CN); Denny Hellige, Bad Oeynhausen (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 342 days.

(21) Appl. No.: 18/707,120

(22) PCT Filed: Oct. 24, 2022

(86) PCT No.: PCT/DE2022/100782
§ 371 (c)(1),
(2) Date: May 2, 2024

(87) PCT Pub. No.: WO2023/078498
PCT Pub. Date: May 11, 2023

(65) Prior Publication Data

US 2026/0163314 A1 Jun. 11, 2026

(30) Foreign Application Priority Data

Nov. 3, 2021 (CN) .......................... 202111293110.8

(51) Int. Cl.
*H01R 24/20* (2011.01)
*H01R 13/207* (2006.01)
(Continued)

(52) U.S. Cl.
CPC ........... *H01R 24/20* (2013.01); *H01R 13/207* (2013.01); *H01R 13/426* (2013.01);
(Continued)

(58) Field of Classification Search
CPC .... H01R 24/20; H01R 13/207; H01R 13/426; H01R 13/512; H01R 13/516;
(Continued)

(56) References Cited

U.S. PATENT DOCUMENTS 5,137,470 A 8/1992 Doles
7,329,148 B2 * 2/2008 Khemakhem ............ H04Q 1/13 439/578

(Continued)

OTHER PUBLICATIONS

International Preliminary Report on Patentability, dated May 2, 2024, for International Patent Application No. PCT/DE2022/100782. (10 pages).

(Continued)

*Primary Examiner* — Gary F Paumen
(74) *Attorney, Agent, or Firm* — Seed Intellectual Property Law Group LLP

(57) ABSTRACT

A single-pole connector is provided that includes a contact, which includes a contact housing; and a hood for receiving the contact; wherein the contact housing is provided with a limiting frame on the outer surface, wherein the limiting frame is provided with at least two limiting tongues; wherein the hood has at least two limiting recesses and a female threaded portion on the inner surface, wherein the female threaded portion is closer to the mating face than the limiting recess; wherein the single-pole connector further includes a retaining ring having a male threaded portion, wherein after inserting the contact housing into the hood counter to the plug-in direction until the limiting tongue is inserted into the limiting recess, the retaining ring is screwed into the hood, whereby the contact housing is fixed in the hood by a screw connection. A multiple plug-type connector and a connector system is also provided. A simple fastening of the contact can be achieved with the single-pole connector and the multiple plug-type connector. Independent installing or (Continued)

removal of the single-pole connector can be achieved with the connector system, thus facilitating assembly.

10 Claims, 9 Drawing Sheets

(51) Int. Cl.

| | |
|---|---|
| ***H01R 13/426*** | (2006.01) |
| ***H01R 13/512*** | (2006.01) |
| ***H01R 13/516*** | (2006.01) |
| ***H01R 13/621*** | (2006.01) |
| ***H01R 13/645*** | (2006.01) |
| ***H01R 101/00*** | (2006.01) |

(52) U.S. Cl.
CPC ......... *H01R 13/512* (2013.01); *H01R 13/516* (2013.01); *H01R 13/6215* (2013.01); *H01R 13/6456* (2013.01); *H01R 2101/00* (2013.01); *H01R 2201/26* (2013.01)

(58) Field of Classification Search
CPC ............ H01R 13/6215; H01R 13/6456; H01R 2201/26; H01R 2101/00
USPC .................................................. 439/345, 578
See application file for complete search history.

(56) References Cited

U.S. PATENT DOCUMENTS

| | | | | |
|---|---|---|---|---|
| 7,425,153 | B1 * | 9/2008 | Miller .................. | H01R 9/0524 439/669 |
| 7,513,795 | B1 * | 4/2009 | Shaw ................... | H01R 9/0521 439/585 |
| 7,841,896 | B2 * | 11/2010 | Shaw ................... | H01R 9/0521 439/585 |
| 8,371,874 | B2 * | 2/2013 | Shaw ................. | H01R 13/5205 439/578 |
| 2007/0099498 | A1 | 5/2007 | Khemakhem et al. | |
| 2011/0003507 | A1 | 1/2011 | Van Swearingen et al. | |

OTHER PUBLICATIONS

International Search Report and Written Opinion, mailed Jan. 30, 2023, for 1 International Patent Application No. PCT/DE2022/100782. (15 pages) (with English translation of International Search Report).

* cited by examiner

SINGLE-POLE CONNECTOR, MULTIPLE PLUG-TYPE CONNECTOR AND CONNECTOR SYSTEM CONSISTING THEREOF

BACKGROUND

Technical Field

The present disclosure relates to the technical field of connectors, such as a single-pole connector, a multiple plug-type connector, and a connector system which includes the single-pole connector and the multiple plug-type connector.

Description of the Related Art

Connector systems for transmitting high electrical currents are widely used in the field of rail vehicles. In detail, they are used, for example, to produce an electrical or signal-based connection between two railcars. When applied in practice, such a connector system generally has a high weight and large dimensions, as a result of which on-site fitting by a fitter is made difficult.

BRIEF SUMMARY

Embodiments of the disclosure provide a single-pole connector and a multiple plug-type connector, in which in each case the fastening and the disassembly of a contact are achieved by a retaining ring and a limiting frame, by which the structure is simplified and maintenance and replacement of the contact made easier. Embodiments of the disclosure also provide a connector system which includes the single-pole connector and the multiple plug-type connector which have been described above, by which independent fitting or disassembly of the single-pole connector on the multiple plug-type connector can be achieved and on-site fitting of the connector system thus made easier.

In one embodiment, a single-pole connector is provided. It has a plug-in side for plugging to a mating connector and a connection side for connecting a cable and includes: a contact, wherein the contact includes a contact housing; and a hood for receiving the contact; wherein the contact housing is provided with a limiting frame on the outer surface, wherein the limiting frame is provided with at least two limiting tongues; wherein the hood has at least two limiting recesses and an internal thread portion on the inner surface, wherein the internal thread portion is situated closer to the plug-in side than the limiting recess; wherein the single-pole connector moreover includes a retaining ring with an external thread portion, wherein, after the contact housing is inserted into the hood counter to the plugging direction until the limiting tongue is inserted into the limiting recess, the retaining ring is screwed into the hood, as a result of which the contact housing is fixed in the hood by a screw connection.

In one embodiment, the limiting frame includes an annular body, wherein the limiting tongue is integrally formed as a single piece on the annular body and extends perpendicular to the annular body; wherein the annular body is designed as a single part or as two parts. In a different embodiment, the limiting tongue may be connected to the annular body by adhesive bonding, welding, riveting or in a different fashion.

In one embodiment, the contact housing is provided with an annular cavity on the outer surface, wherein the annular body of the limiting frame is embedded in the annular cavity.

In a different embodiment, the annular body includes an edge flange which snaps onto an edge flange on the outer surface of the contact housing in order to fix the annular body on the contact housing.

In one embodiment, the retaining ring may be cylindrical, wherein a plurality of notches are provided on one side of the retaining ring in order to come into engagement with a tool for screwing in the retaining ring; wherein an inwardly projecting flange is arranged on the other side of the retaining ring in order to bear against the annular body of the limiting frame; wherein the external thread portion is arranged between the notches and the flange on the outer circumference of the retaining ring.

In one embodiment, the hood includes a hood-insertion portion, a handle, and a flange portion which is arranged between the hood-insertion portion and the handle; wherein the inner surface of the region of the flange portion has the limiting recess and the internal thread portion.

In one embodiment, the inner surface of the region of the flange portion may be designed in the form of a stepped cylinder and includes a first cylinder portion and a second cylinder portion, wherein an annular shoulder is formed at the boundary of the first cylinder portion and the second cylinder portion, wherein the limiting recess is designed as an axial recess which extends axially from the annular shoulder, and wherein the internal thread portion is formed on the second cylinder portion. In one embodiment, the limiting tongue may be inserted axially into the limiting recess until the annular body bears against the annular shoulder, by which limiting of the contact housing on the inner surface of the hood is achieved. In one embodiment, the diameter of the second cylinder portion may be larger than the diameter of the first cylinder portion and the second cylinder portion is situated closer to the hood-insertion portion than the first cylinder portion.

In one embodiment, the flange portion may be quadrilateral or rectangular, wherein two diagonally arranged coding pin holes and two diagonally arranged threaded holes for receiving coding pins or locking elements are arranged in the corners of the flange portion; alternatively, in a different embodiment the outer contour of the hood-insertion portion may be square or rectangular, wherein two diagonally arranged coding pin holes and two diagonally arranged threaded holes for receiving the coding pins or the locking elements are provided in the corners of the hood-insertion portion; wherein the inner contour of the hood-insertion portion is cylindrical.

In at least one embodiment, a multiple plug-type connector is provided. The multiple plug-type connector includes a through housing which has at least one opening and a plurality of sockets which are arranged at the opening; and a plurality of contacts, wherein the contact is provided with a limiting frame on the outer surface, wherein the limiting frame is provided with at least two limiting tongues; wherein the socket has at least two limiting recesses and an internal thread portion on the inner surface, wherein the multiple plug-type connector further includes a plurality of retaining rings with in each case one external thread portion, wherein, after the contact is inserted into the socket counter to the plugging direction until the limiting tongue is inserted into the limiting recess, the retaining ring is screwed into the sockets, as a result of which the contact is fixed in the socket by a screw connection.

In one embodiment, a connector system is provided. The connector system includes a plurality of single-pole connectors and the multiple plug-type connector, wherein the plurality of single-pole connectors can be inserted independently of one another into their respective sockets.

In one embodiment, the single-pole connector may be designed as a plug-type connector and the multiple plug-type connector as a socket connector; or vice versa.

The single-pole connector, the multiple plug-type connector, and the connector system described herein meet the requirements of an insulation resistance test (test at $R_1 \geq 10^{10}$ Ω), a dielectric strength test (test at 12 kV), an IPX8 test (for waterproofness and dustproofness) (no ingress of water under test conditions over a period of 17 hours), and a derating test, and no contact interruption of ≥1 μs occurs during the vibration test.

BRIEF DESCRIPTION OF THE SEVERAL VIEWS OF THE DRAWINGS

Embodiments of the present disclosure are illustrated in the attached drawings and explained in more detail below.

DETAILED DESCRIPTION

The present disclosure will be described in more detail below on the basis of the exemplary embodiments and with reference to the attached drawings. In the description, the same or similar reference signs designate the same or similar parts. The following description of the embodiment with reference to the attached drawings serves to explain the basic concepts of the present disclosure and is in no way to be understood as limiting the disclosure.

In the present disclosure, the directional terms "in front" and "behind" are defined with reference to the plugging direction. It should be noted that the plugging directions of the plug-type connector and the socket connector run in opposite directions to each other in the present disclosure. The terms "inner" and "outer" are defined with reference to the radial direction of the single-pole connector and the socket. The terms "inward" and "outward" relate in each case to a direction facing the axis radially and a direction facing away from the axis radially, respectively.

Figure 1:
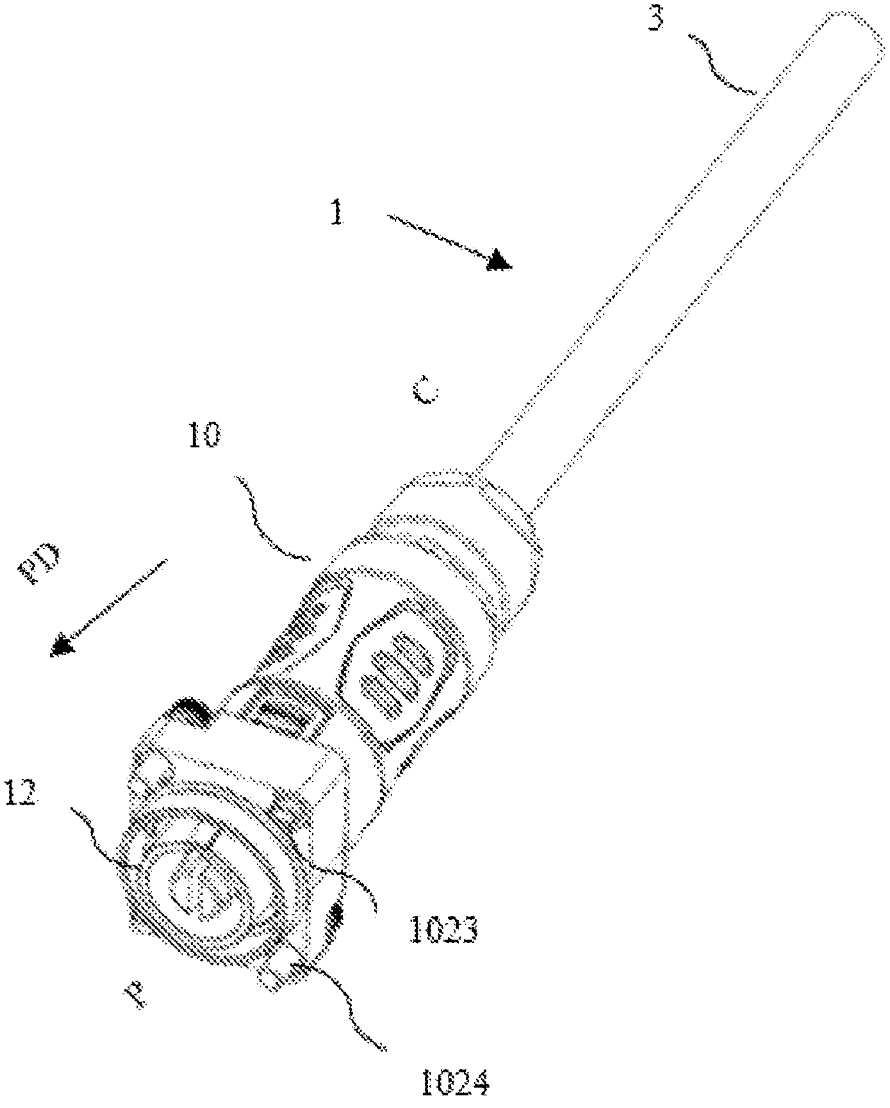
FIG. 1 shows a single-pole connector in a three-dimensional illustration.

FIG. 1 shows a single-pole connector 1. "Single-pole" here means that it is one individual connector. The single-pole connector 1 serves to transmit a high electrical current, for example of 250 or 350 amperes. The single-pole connector 1 is designed as a plug-type connector and comprises a hood 10 and a contact (in this case a plug-type contact) received in the hood. The single-pole connector 1 has a plug-in side P for plugging to a mating connector (namely the multiple plug-type connector) 2 (FIG. 8); and a connection side C for connection of a cable 3.

Figure 2:
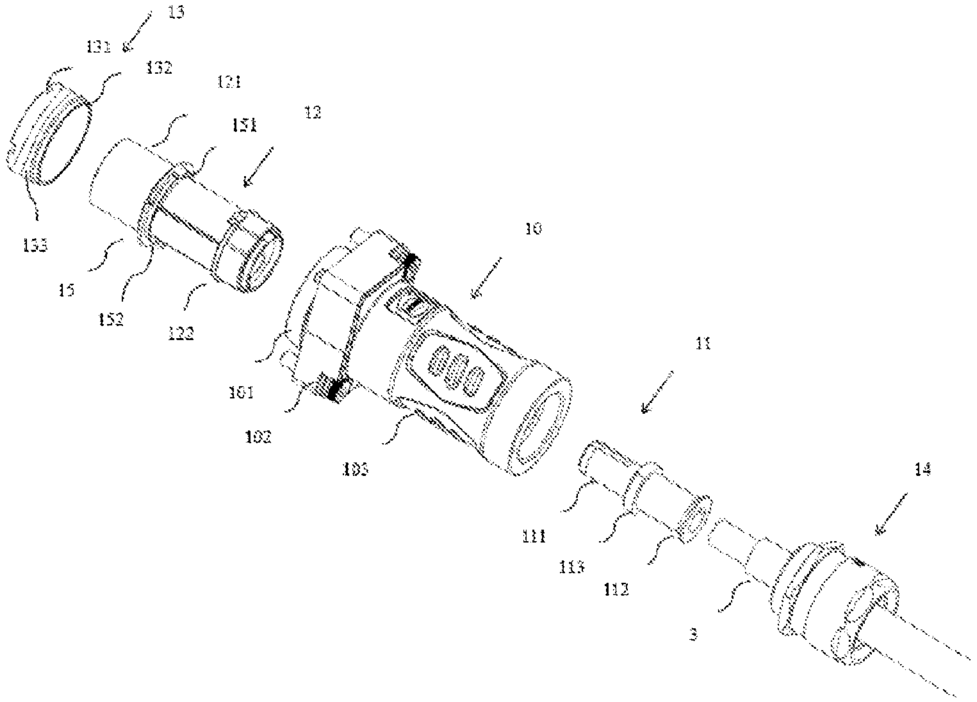
FIG. 2 shows the single-pole connector in an exploded view.

As shown in FIG. 2, the contact is designed as substantially cylindrical and consists of two parts, namely a terminal 11 and a contact housing 12 which receives the terminal 11. The terminal 11 comprises, viewed in a plugging direction PD, in order, a terminal insertion portion 111 and a terminal connection portion 112. An annular flange 113 is provided here at the connecting point between the terminal insertion portion 111 and the terminal connection portion 112 on an outer surface of the terminal 11. The contact housing 12 is an insulating housing and comprises, viewed in the plugging direction PD, in order, a contact housing insertion portion 121 and a contact housing connection portion 122. An annular cavity 123 (FIG. 7) is provided here at the connecting point between the contact housing insertion portion 121 and the contact housing connection portion 122 on an outer surface of the contact housing 12. A limiting frame 15 is recessed on the outer surface of the contact housing 12, in detail in the annular cavity 123. The limiting frame 15 comprises an annular body 152 and at least two limiting tongues 151. Four, six, eight, or any other number of the limiting tongues 151 can also be provided. The limiting tongues 151 are intended to be arranged rotationally symmetrically in pairs. The limiting tongue 151 is integrally formed as a single piece on the annular body, i.e., specifically on an upper edge of the annular body. In another embodiment, the limiting tongue 151 can alternatively be connected to the annular body, inter alia, by welding, riveting, or adhesive bonding. The limiting tongue 151 runs perpendicular to the annular body, i.e., perpendicular to the annular body counter to the plugging direction PD and in the direction of the contact housing connection portion 122. In another embodiment, the limiting frame can alternatively comprise a latching flange which snaps onto a latching flange on the contact housing in order to fix the limiting frame on the contact housing. In an embodiment, the annular body of the limiting frame can be designed as a single part, namely as a whole ring. Alternatively, a two-part design, i.e., consisting of two semicircles, is conceivable.

The hood 10 is likewise designed substantially as cylindrical and comprises, viewed in the plugging direction PD, in order, a hood insertion portion 101, a flange portion 102, and a handle 103. The hood insertion portion 101 is designed as cylindrical and can alternatively be designed as square or rectangular. The flange portion 102 is designed as square or rectangular. Two diagonally arranged coding pin holes 1021 and two diagonally arranged threaded holes 1022 (FIG. 3) are provided at its corners. The coding pin holes 1021 serve to receive coding pins 1023 and the threaded holes 1022 serve to receive locking elements 1024, for example screws. In another embodiment, the front corners of the hood insertion portion 101 form the coding pin holes 1021 and the threaded holes 1022 if the hood insertion portion 101 is designed as square or rectangular. The inner surface of the hood insertion portion 101 is here still designed as cylindrical.

Figure 3:
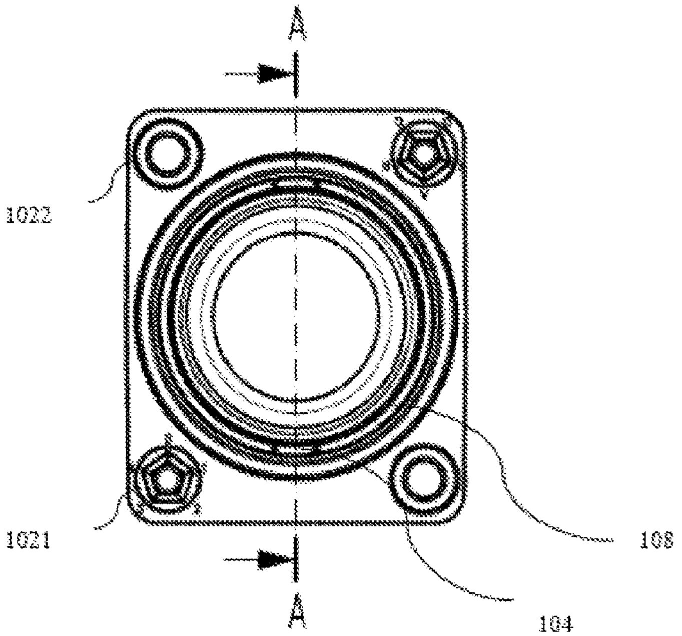
FIG. 3 shows a plan view of a hood of the single-pole connector.
Figure 4:
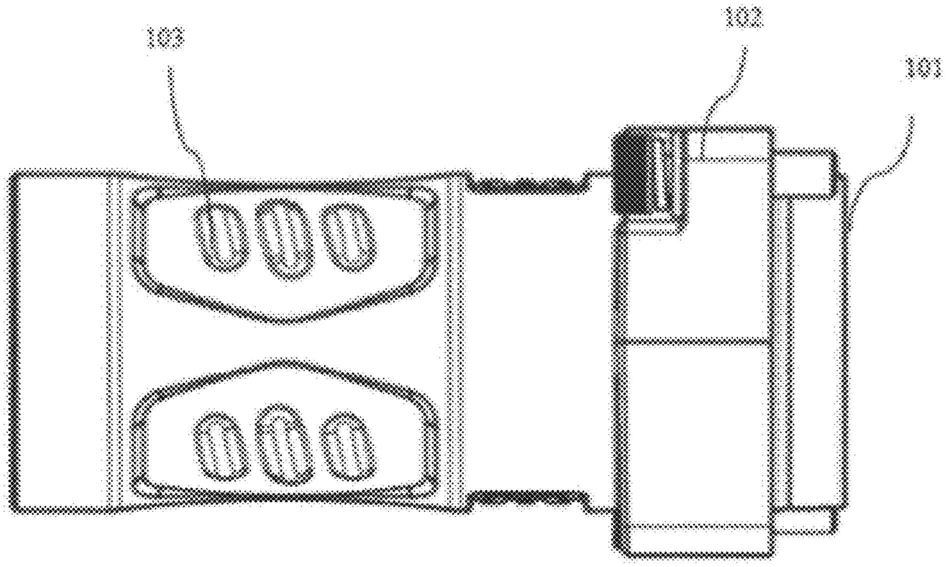
FIG. 4 shows the hood of the single-pole connector in a side view.
Figure 5:
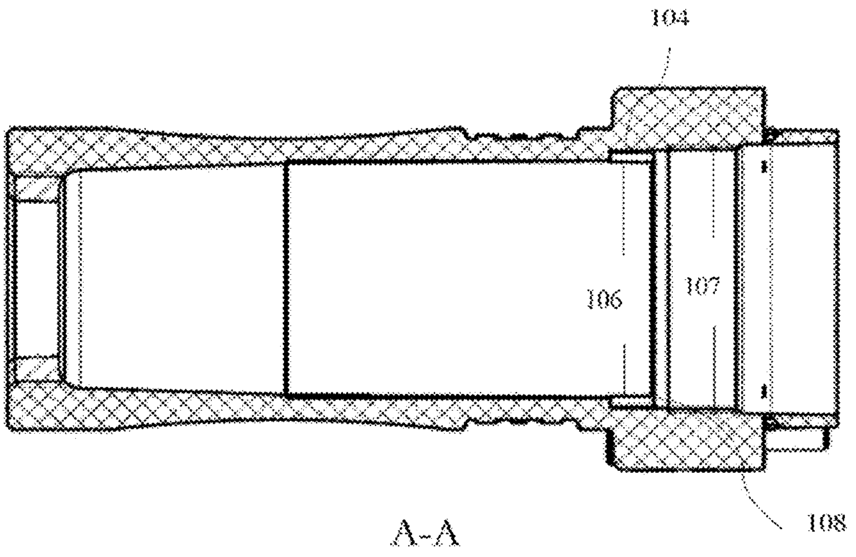
FIG. 5 shows the hood of the single-pole connector in a view in section.

FIGS. 3, 4, and 5 show the hood 10 in each case in a plan view, a side view, and a view in section. The inner surface of the region of the flange portion 102 of the hood 10 is designed in the shape of a stepped cylinder and comprises in the plugging direction PD, in order, a first cylindrical portion 106 and a second cylindrical portion 107, the diameters of which increase in order. An annular shoulder 108 is thus formed at the boundary of the first cylindrical portion 106 and the second cylindrical portion 107. An axial limiting recess 104 is formed at the annular shoulder 108 by an axial cut. An internal thread portion 105 is formed at the second cylindrical portion 107.

The single-pole connector 1 comprises a retaining ring 13 which is designed substantially as cylindrical and is designed for the purpose of fixing the contact, i.e., specifically the contact housing 12, in the hood 10. The retaining ring 13 has on one side (i.e., on a front side in the plugging direction PD (FIG. 2)) a plurality of notches 131, two, three, four, or any other number of which are for example provided, which serve to receive a tool (not shown) serving to screw in the retaining ring 13, for example an engagement jaw for receiving a tool; the retaining ring 13 is provided on the other side (namely on a rear side in the plugging direction PD) with a flange 132 with a certain thickness. The flange 132 projects radially inward and has the approximate shape of the bottom edge of a key. An external thread portion 133 is provided between the notches 131 and the flange 132 on an outer surface of the retaining ring 13.

Furthermore, the single-pole connector 1 comprises a cable connector 14 for fixing the cable 3 on the connection side of the single-pole connector 1.

Figure 6:
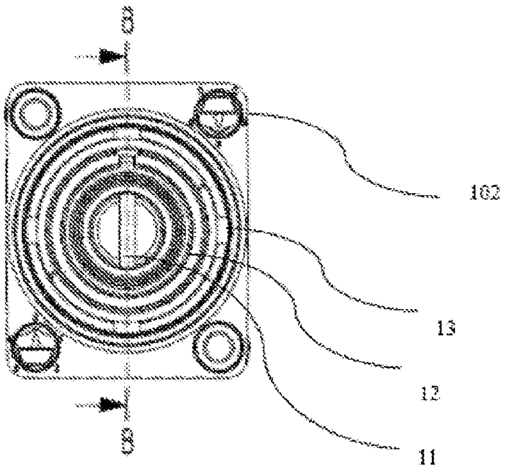
FIG. 6 shows a plan view of the single-pole connector.
Figure 7:
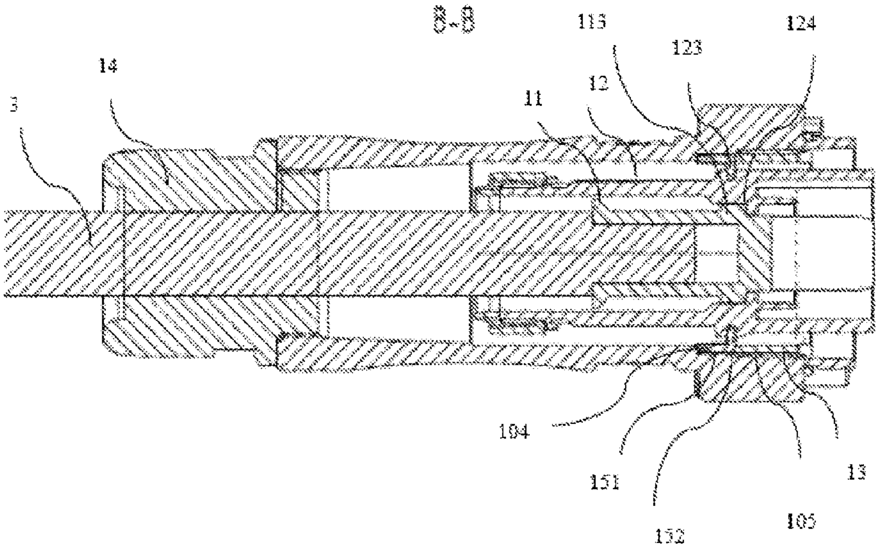
FIG. 7 shows the single-pole connector in a view in section.

FIGS. 6 and 7 show the single-pole connector 1 in each case in a plan view or a view in section. The fitting of the single-pole connector 1 will be described below with reference to FIGS. 2, 6, and 7. First, an insulating sheathing layer and an EMC fabric layer at a front end of the cable 3 are removed in order to expose an inner core. Then, the cable connector 14 is pushed onto the cable 3 counter to the plugging direction PD. Then, the core of the cable 3 is inserted into the terminal connection portion 112 of the terminal 11, for example by the terminal connection portion 112 of the terminal 11 being crimped by a crimping tool such that the inner surface of the terminal connection portion 112 is in close engagement with the core of the cable 3. At the same time, or before or afterwards, the contact housing 12 is inserted into the hood 10 counter to the plugging direction PD from the plug-in side P and the limiting tongue 151 of the limiting frame 15 begins to enter the limiting recess 104 of the inner surface of the hood until one side of the annular body 152 of the limiting frame 15 bears against the annular shoulder 108 (i.e., specifically against the remaining region of the shoulder apart from the limiting recess), by which the limiting of the contact housing 12 in the hood 10 is achieved and thus further movement of the contact housing 12 counter to the plugging direction is limited. A certain intermediate space is now still present between the bottom region of the limiting recess 104 and the tongue 151. The retaining ring 13 is then screwed into the hood 10 counter to the plugging direction by a tool. During the screwing, the external thread portion 133 of the retaining ring 13 comes into threaded engagement with the internal thread portion 105 of the inner surface of the hood 10. The flange 132 of the retaining ring 13 ultimately bears against the other side of the annular body 152, by which the retaining ring 13 and thus the contact housing 12 are fixed in the hood 10. The terminal 11 is then inserted in the plugging direction from the connection side C into the hood 10 until the annular flange 13 of the terminal 11 bears against an abutment portion 124 of the inner surface of the contact housing 12, by which a movement of the terminal 11 forward in the plugging direction is prevented. The terminal 11 and the cable 3 are ultimately fixed in the hood 10 by engagement of the rear part of the handle 103 of the hood 10 with the cable connector 14, by which the fitting of the single-pole connector is completed.

Figure 8:
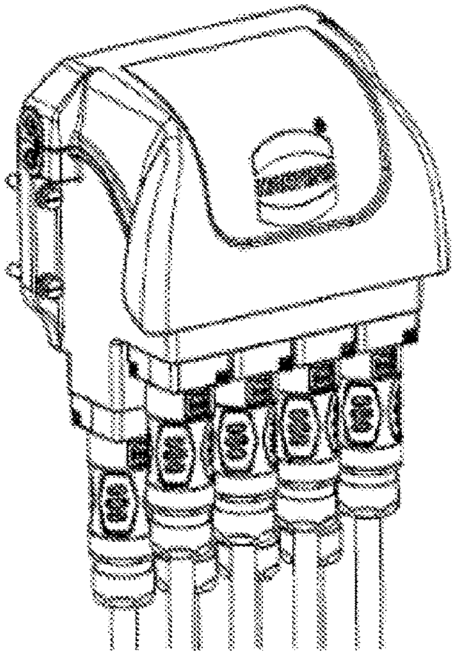
FIG. 8 shows a connector system in a three-dimensional illustration.
Figure 9:
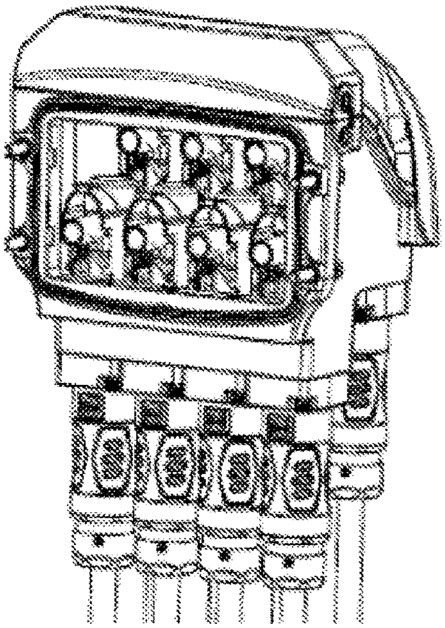
FIG. 9 shows the connector system in a view from below.
Figure 10:
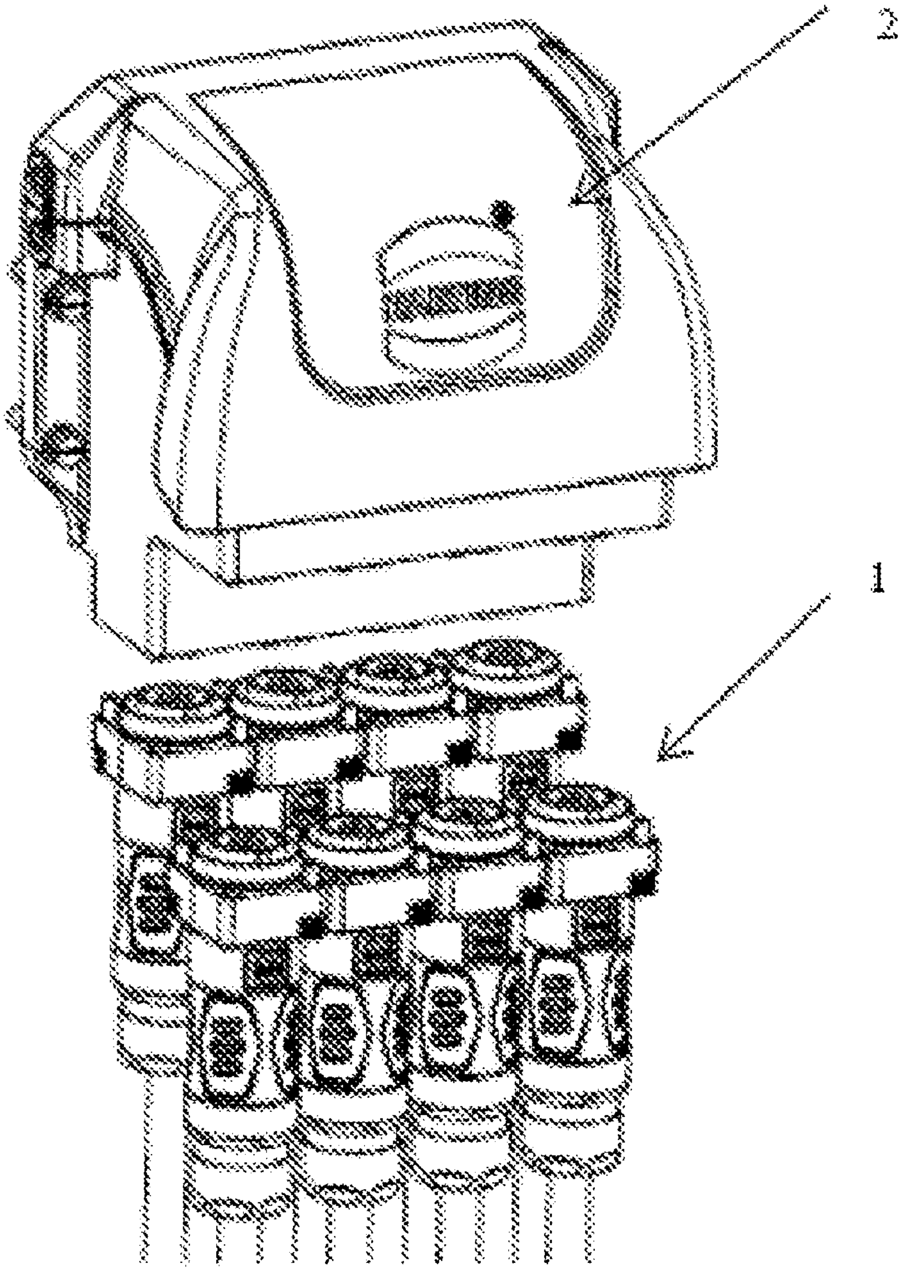
FIG. 10 shows the connector system in an exploded view.

FIGS. 8 to 10 show a connector system which is formed by the single-pole connector 1 being plugged together with the multiple plug-type connector 2. The connector system has a plurality of, for example eight, single-pole connectors. In another embodiment, the connector system can alternatively comprise one, two, four, six, or any other number of single-pole connectors. The eight single-pole connectors are attached independently of one another on the multiple plug-type connector 2 such that, when used in practice, single-pole connectors can be attached individually and the fitting difficulty thus reduced.

Figure 11:
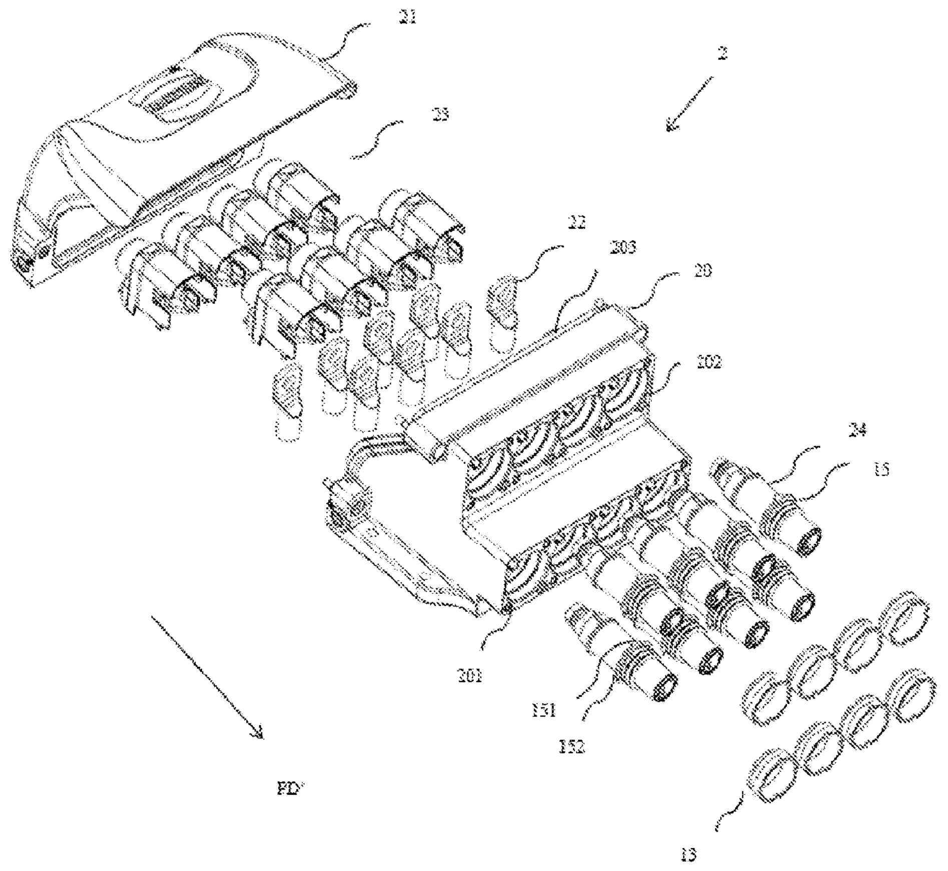
FIG. 11 shows a multiple plug-type connector in an exploded view.
Figure 12:
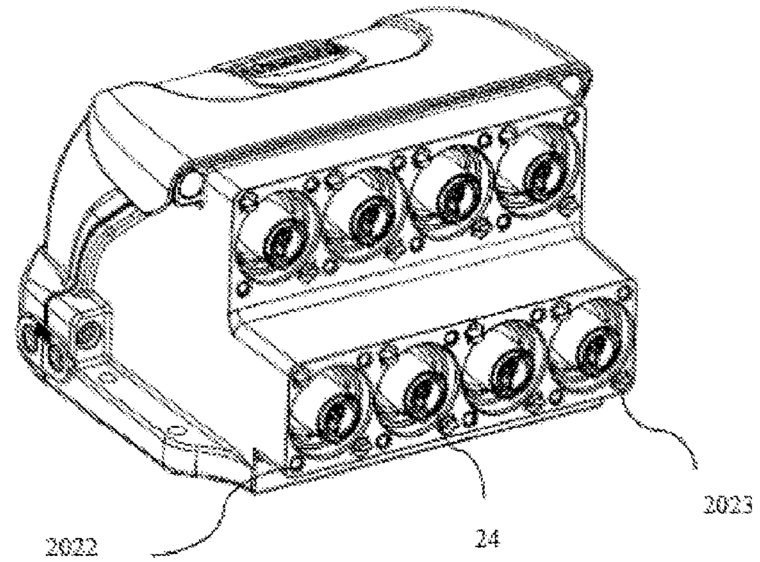
FIG. 12 shows the multiple plug-type connector in a three-dimensional illustration.
Figure 13:
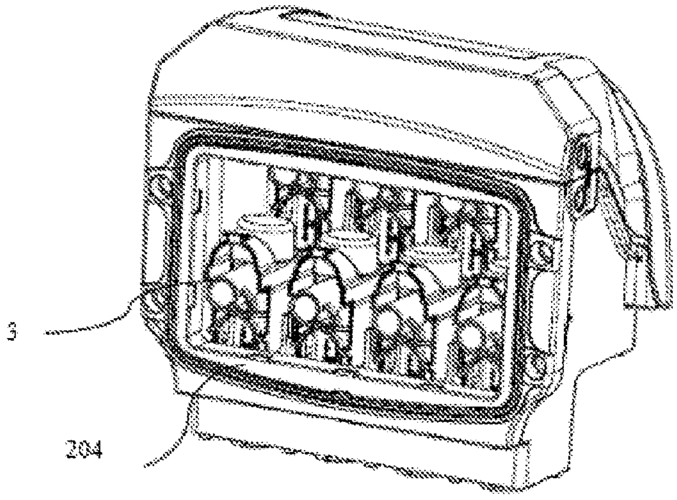
FIG. 13 shows the multiple plug-type connector in a view from below.

The multiple plug-type connector 2 will be explained below with reference to FIGS. 11 to 14. The multiple plug-type connector 2 is designed as a socket connector and generally configured for attachment to a railcar wall of a train. As can be seen in FIG. 11, the multiple plug-type connector 2 comprises a through housing 20, a top cover 21 and an insulating cap 23, a cable connector 22, a contact 24 (designed in this case as a socket contact), and a retaining ring 13, which are accommodated in the through housing.

The through housing 20 has two openings 201 which have a substantially rectangular design and are vertically spaced apart from each other. A plurality of sockets 202 are arranged in each case at each of the openings. In another embodiment, the through housing can alternatively have an opening or different number of openings. In another embodiment, one of the plurality of openings can be covered by a cover plate when not in use. A flange of each of the sockets is provided with two diagonally arranged coding pin holes 2021 and two diagonally arranged threaded holes 2022 for receiving coding pins 2023 or locking elements 1024 of the flange portion 102 of the single-pole connector 1. The coding pins 2023 of the socket and the coding pins 1023 of the single-pole connector interact with one another, by which faulty plugging-together can be prevented. During the fitting of the connector system, the plurality of single-pole connectors 1 can be inserted independently of one another into their respective sockets. The through housing 20 has an input opening 203 which is covered by the top cover 21. As shown in FIG. 10, the through housing 20 has an indentation 204, the plane of which runs perpendicular to the plane of the opening 201. The indentation 204 serves for the insertion of the cable 3 and the attaching of the multiple plug-type connector to a wall of a railcar.

Figure 14:
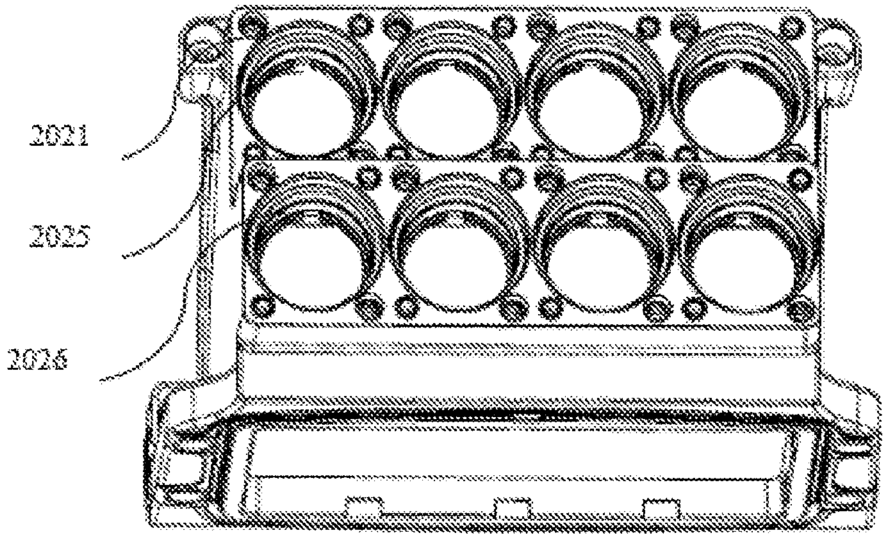
FIG. 14 shows a through housing of the multiple plug-type connector in a three-dimensional illustration.

The number of the socket contacts 24 can correspond to the number of the sockets 202. The contact 24 is inserted into the socket 202 from outside counter to a plugging direction PD' until the limiting tongue 151 of the limiting frame 15 of the contact 24 is inserted into the limiting recess 2025 of the inner surface of the socket 202 (FIG. 14). The retaining ring 13 is then screwed into the socket 202 such that the external thread portion 133 of the retaining ring 13 comes into engagement with the internal thread portion 2026 of the socket in order thus to fix the contact 24 in the socket 202. The plurality of insulating caps 23 cover tail ends of the contacts 24 and the tail end is connected to the cable 3 via the cable connector 22. The fitting of the multiple plug-type connector is thus completed.

It will be understood by people skilled in the art that the present disclosure is in no way limited to the details of the above embodiments and instead can be implemented in other concrete forms. Moreover, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A single-pole connector having a plug-in side for plugging to a mating connector and a connection side for connecting a cable, the single-pole connector comprising:

a contact, wherein the contact comprises a contact housing, and wherein the contact housing is provided with a limiting frame on an outer surface, wherein the limiting frame is provided with at least two limiting tongues;

a hood for receiving the contact, wherein the hood has at least two limiting recesses and an internal thread portion on an inner surface, wherein the internal thread portion is situated closer to the plug-in side than the limiting recesses, a retaining ring with an external thread portion, wherein, after the contact housing is inserted into the hood counter to a plugging direction until each limiting tongue is inserted into a respective one of the limiting recesses, the retaining ring is screwed into the hood, as a result of which the contact housing is fixed in the hood by a screw connection.

2. The single-pole connector as claimed in claim 1, wherein the limiting frame comprises an annular body, wherein each limiting tongue is integrally formed as a single piece on the annular body and extends perpendicular to the annular body; wherein the annular body is designed as a single part or as two parts.

3. The single-pole connector as claimed in claim 2, wherein the contact housing is provided with an annular cavity on the outer surface, wherein the annular body of the limiting frame is embedded in the annular cavity.

4. The single-pole connector as claimed in claim 3, wherein the retaining ring is cylindrical, wherein a plurality of notches are provided on one side of the retaining ring in order to come into engagement with a tool for screwing in the retaining ring; wherein an inwardly projecting flange is arranged on an other side of the retaining ring in order to bear against the annular body of the limiting frame; wherein the external thread portion is arranged between the plurality of notches and the inwardly projecting flange on an outer circumference of the retaining ring.

5. The single-pole connector as claimed in claim 4, wherein the hood comprises a hood insertion portion, a handle, and a flange portion which is arranged between the hood insertion portion and the handle; and wherein an inner surface of the region of the flange portion has the limiting recesses and the internal thread portion.

6. The single-pole connector as claimed in claim 5, wherein the inner surface of the region of the flange portion is designed in the form of a stepped cylinder and comprises a first cylinder portion and a second cylinder portion, wherein an annular shoulder is formed at a boundary of the first cylinder portion and the second cylinder portion, wherein each limiting recess is designed as an axial recess which extends axially from the annular shoulder, and wherein the internal thread portion is formed on the second cylinder portion.

7. The single-pole connector as claimed in claim 3, wherein the flange portion is quadrilateral or rectangular, wherein two diagonally arranged coding pin holes and two diagonally arranged threaded holes for receiving coding pins or locking elements are arranged in the corners of the flange portion; or wherein an outer contour of the hood insertion portion is square or rectangular, wherein two diagonally arranged coding pin holes and two diagonally arranged threaded holes for receiving the coding pins or the locking elements are provided in the corners of the hood insertion portion; wherein an inner contour of the hood insertion portion is cylindrical.

8. A multiple plug-type connector, comprising:

a through housing, wherein the through housing has at least one opening and a plurality of sockets which are arranged at the opening;

a plurality of contacts, wherein each contact is provided with a limiting frame on an outer surface, wherein the limiting frame is provided with at least two limiting tongues; wherein the socket has at least two limiting recesses and an internal thread portion on an inner surface, wherein the multiple plug-type connector comprises a plurality of retaining rings with in each case one external thread portion, wherein, after the contact is inserted into the socket counter to a plugging direction until each limiting tongue is inserted into a respective one of the limiting recesses, the retaining ring is screwed into the sockets, as a result of which the contact is fixed in the socket by a screw connection.

9. A connector system, comprising:

a plurality of single-pole connectors as claimed in claim 1; and a multiple plug-type connector, wherein the single-pole connectors can be inserted independently of one another into respective sockets of the multiple plug-type connector.

10. The connector system as claimed in claim 9 wherein, each single-pole connector is designed as a plug-type connector and the multiple plug-type connector as a socket connector.

* * * * *